United States Patent [19]
Gold

[11] 3,894,888
[45] July 15, 1975

[54] RESERVE-TYPE ELECTROCHEMICAL BATTERY

[75] Inventor: Charles Gold, Hallandale, Fla.
[73] Assignee: Electrochem, Inc., New York, N.Y.
[22] Filed: Mar. 25, 1974
[21] Appl. No.: 454,356

[52] U.S. Cl. ............................................. 136/114
[51] Int. Cl.² ........................................ H01M 21/00
[58] Field of Search .............. 136/114, 112, 113, 90

[56] References Cited
UNITED STATES PATENTS

| | | | |
|---|---|---|---|
| 1,417,692 | 5/1922 | Rosen | 136/113 |
| 1,566,927 | 12/1925 | Rosen | 136/113 |
| 2,832,814 | 4/1958 | Shannon | 136/90 |
| 3,228,801 | 1/1966 | Snyder | 136/113 |
| 3,653,973 | 4/1972 | Broglid | 136/114 |
| 3,712,835 | 1/1973 | Kaye | 136/114 |
| 3,748,183 | 7/1973 | Zaleski | 136/114 |

*Primary Examiner*—John H. Mack
*Assistant Examiner*—C. F. Lefevour
*Attorney, Agent, or Firm*—Donald E. Nist

[57] ABSTRACT

An improved reserve-type electrochemical battery includes one or more cells, each cell having a pair of spaced electrodes, electrolyte in a separate flexible container adjacent the space between the electrodes, and means for opening the electrolyte container to cause the electrolyte to pass into said space and activate the cell. Resilient means may be utilized to exert compressive force on the electrolyte container to assure its emptying once it is open. This arrangement permits storage of the cell in an inactivated state for indefinite periods of time without deterioration of the cell, and instantaneous introduction of electrolyte into the cell when activation of the latter is desired.

2 Claims, 1 Drawing Figure

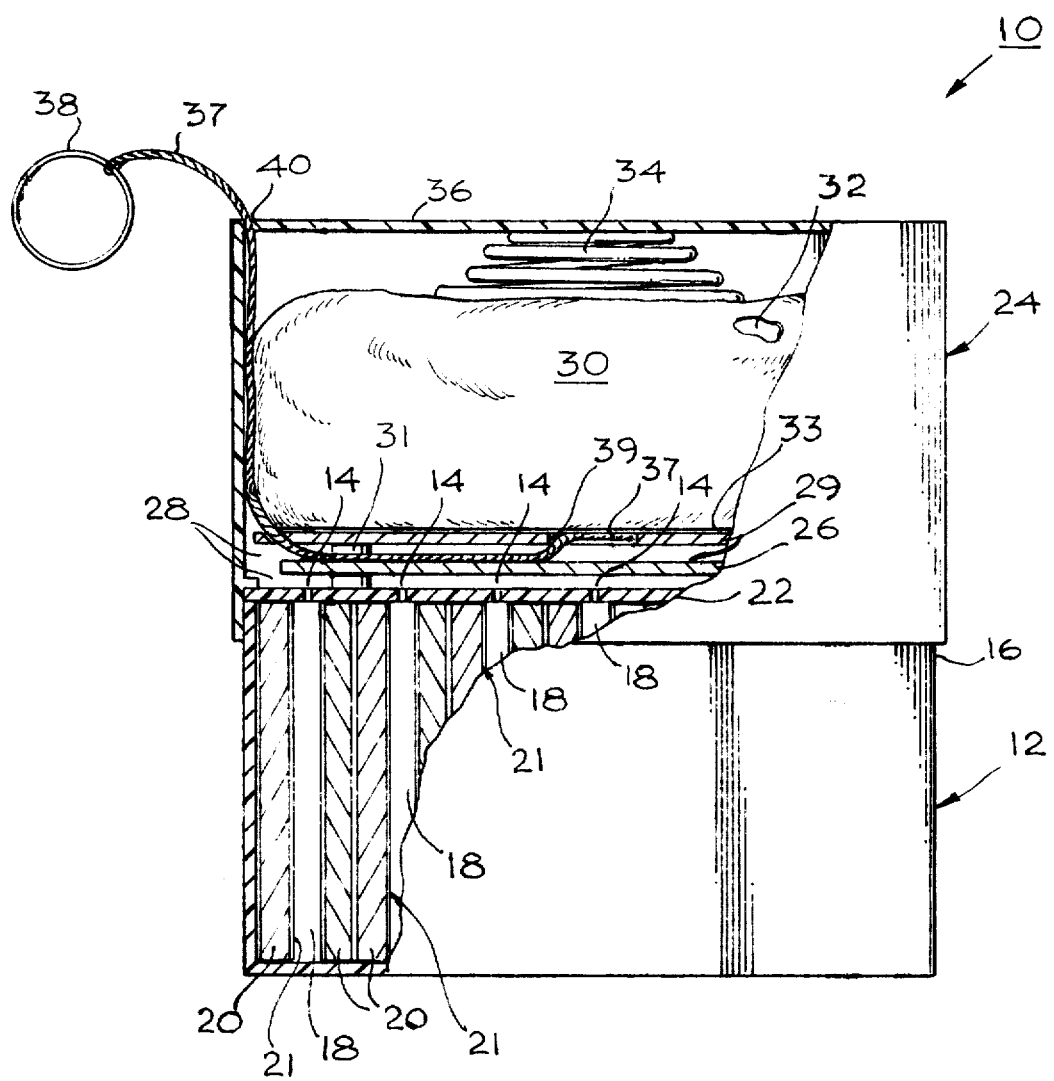

RESERVE-TYPE ELECTROCHEMICAL BATTERY

BACKGROUND OF THE INVENTION

1. Field of the Invention

The present invention generally relates to electrochemical batteries and more particularly to those of the reserve type.

2. Prior Art

Reserve-type electrochemical batteries are characterized by providing electrical power on a "stand-by" basis. In some instances, electrolyte is kept out of contact with the electrodes of the battery until the battery is used, whereupon sufficient electrolyte is added to the battery to activate the battery for the required period of time. In others of such batteries, one or more components of the electrolyte are kept out of contact with the electrodes. When it is desired to activate such batteries, the remaining required components, for example, water, are added to the battery to form the completed electrolyte.

Separate storage and handling of the electrolyte or components thereof create a problem. Separate storage is inconvenient and handling of the electrolyte or its components may be inconvenient, dangerous and time consuming. Accordingly, there has been a need for an improved reserve-type electrochemical battery which can be activated instanteneously in a simple, efficient and safe manner while providing for convenient storage of the electrolyte and/or its components.

SUMMARY OF THE INVENTION

The present invention generally satisfies the foregoing needs. The invention is substantially as set forth in the Abstract above. In this regard, liquid electrolyte or the like is stored in a flexible container positioned, as part of the overall system, adjacent to fill ports of the battery. Those ports communicate with the electrolyte space between one or more pairs of electrodes in the battery. The container enclosing the electrolyte is under a positive pressure which assures that, once the container is open, the electrolyte will pass readily therefrom through the ports and into the electrolyte space. To facilitate this passage, usually the electrolyte container is placed above the ports so that the electrolyte can be gravity fed through the ports.

In the device of the invention, the electrolyte container is spaced a short distance from the ports as by being positioned on a platform directly over the ports. The platform has a large slot in it so that the electrolyte can readily pass down therethrough. The electrolyte container is openable by tearing as by a pull tab sealed thereto and is enclosed in a removable cover attached to the battery housing. This results in a compact, easily storable, readily activable battery which is inexpensive but highly effective. Various advantages of the invention are set forth in the following Detailed Description and accompanying Drawings.

DRAWINGS

The single FIGURE of the drawing is a schematic side elevation of a preferred embodiment of the improved reserve-type electrochemical battery of the invention, with portions broken away to illustrate certain internal features thereof.

DETAILED DESCRIPTION

A preferred embodiment of the battery of the invention is shown in schematic side elevation in the single figure. Thus, a reserve-type electrochemical battery 10 is depicted which comprises a generally closed housing 12 defining a plurality of spaced fill ports 14 adjacent the upper end 16 thereof and extending into communication with an electrolyte space 18 between a pair of electrodes 20 in each cell 21 in the housing 12. In the embodiment of the single figure, a generally horizontal top wall 22 of the housing 12 defines the spaced fill ports 14.

A top cover 24 is removably secured to the upper end 16 of the housing 12 and encloses a platform 26 resting on the top wall 22 of the housing 12. The platform 26 includes a pair of fluid passageways or manifolds 28 formed by two spaced parallel (horizontal) plates 29 supported by struts 31.

As shown in the single figure, a flexible electrolyte container 30 is connected to the upper surface (top plate 29) of the platform 26, as by a strip 33 of double faced tape, and thus is spaced from blocking contact with the fill ports 14. The container 30 encloses a volume of electrolyte 32 for the electrodes 20 within the housing 12. The container 30 is maintained in a distended state by the action of a spring 34, specifically, a coil spring as shown in the drawing, which presses against the upper end of the container 30. The spring 34 also presses against the underside of the top wall 36 of the cover 24, as shown in the single figure.

It will be understood that other resilient means in place of the spring 34 can be disposed against the container 30 so long as they maintain it under compressive force whereby when the container 30 is opened, the electrolyte 32 will readily pass therefrom through the platform 26 and the fill ports 14 into the electrolyte spaces 18. When such resilient means are employed, it is not necessary to place the container 30 above the fill ports 14. Such positioning, however, permits gravity to aid in the passage of the electrolyte 32 from the container 30, when opened, into the housing 12. Such resilient means assures that all, or substantially all, of the electrolyte 32 passes from the electrolyte container 30 once the container is opened.

Means for opening the container are employed in the device. Such means can comprise, as shown in the single figure, a flexible line 37 which is secured at one end to the container 30 in the area of a slot 39 in top plate 29. The other end of line 37 has a pull tab 38 attached to it. A portion of the line 37 and the pull tab 38 are disposed external of the cover 24 through a suitable opening 40 in the cover 24. When it is desired to open the container 30, the pull tab 38 is pulled away from the container 30 so as to tear the line 36 from the container 30 in the area of slot 39, thus rupturing the container 30 and allowing the electrolyte 32 to pass down through slot 39, into manifolds 28 and thus to fill ports 14, then into space(s) 18.

The container 30 may be, for example, fabricated of thin flexible plastic such as polyethylene film, polypropylene film, or the like, which is readily ruptured in the manner indicated. The top cover 24 prevents such rupture prematurely by wholly enclosing the container 30, resilient means, i.e., spring 34 and the platform 26.

The housing 12 can be fabricated of any suitable material, electrically insulative or electrically conductive depending upon the particular design parameters of the cell 10. Thus, for example, the housing 12 can be of metal, plastic, wood or the like. The electrodes 20 can be of any suitable type, for example, those utilized in silver-zinc battery systems whereupon the electrolyte 32 may be, for example, an aqueous potassium hydroxide solution. With aluminum-air or magnesium-air or magnesium-silver chloride batteries, the electrolyte 32 may be, for example, an aqueous solution of sodium chloride or similar inorganic salt. It will be understood that other electrode pairs can be used. Moreover, as indicated above, a plurality of pairs of electrodes can be disposed within the housing 12, as shown in the single figure, the electrodes of each pair being spaced apart from each other to provide a separate electrolyte space 18 in communication with one (or more) of the fill ports 14. Moreover, the electrolyte spaces 18 may interconnect with each other. In any event, all such spaces can be filled merely by rupturing the electrolyte container 30 in the manner indicated, thereby fully activating the battery 10.

The top cover 24 can be of any suitable material such as plastic or the like, sufficiently self-supporting for the coil spring 34 to be compressed by the cover 24 and the electrolyte container 30. The platform 26 can also be of any suitable material, for example, plastic or the like. This requirement pertains to the housing 12 itself and preferably the top cover 24.

The improved reserve-type electrochemical battery 10 can be stored indefinitely with the electrolyte 32 separated from the electrodes 20, i.e., with the electrolyte 32 in the electrolyte container 30 but available for instantaneous activation by rupture of the container 30 and transfer of the electrolyte 32 to the electrolyte space(s) 18. The device 10 is compact, inexpensive, and highly efficient.

Various modifications, changes, alterations and additions can be made in the electrochemical cell of the present invention and in components and parameters of the cell. All such modifications, changes, alterations and additions as are within the scope of the appended claims form part of the present invention.

What is claimed is:

1. An improved reserve-type electrochemical battery, said battery comprising, in combination:
   a. a generally closed housing defining at least one fill port;
   b. at least one pair of electrodes spaced within said housing to define an electrolyte space therebetween, said space being in communication with said port;
   c. a closed, flexible, readily tearable bag containing flowable electrolyte for said battery;
   d. an apertured platform disposed over said port and upon which said bag rests external of said housing;
   e. a removable transparent top cover disposed over said bag and releasably secured to the exterior of said housing;
   f. a coiled spring disposed between said cover and bag and maintaining said bag under compressive force; and,
   g. a pull tab and attached line, the latter secured to the bottom of said bag for opening said bag to permit said electrolyte to flow from said bag through said platform and port and into said electrolyte space for activation of said battery, said tab extending external of said cover.

2. The improved battery of claim 1 wherein said electrolyte is liquid, wherein said bag is plastic and wherein said battery contains a plurality of spaced electrode pairs.

* * * * *